US012236834B2

(12) United States Patent
Zhang

(10) Patent No.: US 12,236,834 B2
(45) Date of Patent: Feb. 25, 2025

(54) DISPLAY APPARATUS, DISPLAY METHOD, COMPUTER DEVICE, STORAGE MEDIUM, AND ELECTRONIC PRODUCT

(71) Applicant: BOE TECHNOLOGY GROUP CO., LTD., Beijing (CN)

(72) Inventor: Shuguo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/608,772

(22) Filed: Mar. 18, 2024

(65) Prior Publication Data

US 2024/0221578 A1 Jul. 4, 2024

Related U.S. Application Data

(63) Continuation of application No. PCT/CN2022/136725, filed on Dec. 6, 2022.

(51) Int. Cl.
*G09G 3/20* (2006.01)
*G09G 3/32* (2016.01)

(52) U.S. Cl.
CPC ......... *G09G 3/2007* (2013.01); *G09G 3/2092* (2013.01); *G09G 3/32* (2013.01);
(Continued)

(58) Field of Classification Search
CPC ... G09G 2320/0233; G09G 2320/0257; G09G 2360/16; G09G 3/20; G09G 3/2007; G09G 3/2092; G09G 3/32; G09G 3/36
See application file for complete search history.

(56) References Cited

U.S. PATENT DOCUMENTS

2014/0254866 A1* 9/2014 Jankowski ........... G08G 1/0175
382/103
2020/0401833 A1* 12/2020 Popov .................... G06V 20/41

FOREIGN PATENT DOCUMENTS

CN 101599258 A 12/2009
CN 104882098 A 9/2015
(Continued)

OTHER PUBLICATIONS

WIPO, International Search Report, issued Apr. 28, 2023.

*Primary Examiner* — Insa Sadio
(74) *Attorney, Agent, or Firm* — HOUTTEMAN LAW LLC

(57) ABSTRACT

A display apparatus includes a gray scale compensation apparatus including a sampling module configured to sample frame image data in a video frame sequence, to obtain current frame image data, and a processor configured to: determine initial gray scale compensation data according to first gray scale data of each pixel in current frame image data and a pre-generated gray scale compensation data table; acquire gray scale compensation information of an image data set corresponding to current frame image data, including gray scale compensation coefficients of the current frame image data in respective display regions; determine target gray scale compensation data according to the gray scale compensation coefficients of the current frame image data in respective display regions and the initial gray scale compensation data; and perform gray scale compensation on the current frame image data according to the target gray scale compensation data, to obtain compensated frame image data.

20 Claims, 6 Drawing Sheets

(52) U.S. Cl.
CPC ............... *G09G 2320/0233* (2013.01); *G09G 2320/0257* (2013.01); *G09G 2360/16* (2013.01)

(56) References Cited

FOREIGN PATENT DOCUMENTS

| | | | |
|---|---|---|---|
| CN | 110364111 | A | 10/2019 |
| CN | 112419979 | A | 2/2021 |
| CN | 112863439 | A | 5/2021 |
| CN | 112927656 | A | 6/2021 |
| CN | 114360436 | A | 4/2022 |
| CN | 114420050 | A | 4/2022 |
| KR | 20170023614 | A | 3/2017 |

* cited by examiner

DISPLAY APPARATUS, DISPLAY METHOD, COMPUTER DEVICE, STORAGE MEDIUM, AND ELECTRONIC PRODUCT

CROSS-REFERENCE TO RELATED APPLICATION

This is a continuation application claiming the benefit of an international application PCT/CN2022/136725, filed on Dec. 6, 2022, the content of which is hereby incorporated by reference in its entirety.

TECHNICAL FIELD

The present disclosure relates to the field of display technology, and in particular to a display apparatus, a display method, a computer device, a storage medium, and an electronic product.

BACKGROUND

With rapid development of sub-millimeter Light-Emitting Diode (mini LED) display technology, a mini LED display product has begun to be applied to the high definition display field of super large display screen. During the mini LEDs operate, since the display screen is lighted for a long time, a large amount of heat energy produced by electronic components fails to disperse in time, screen temperature may rise, and temperature difference between regions appears. Since luminous efficiency of the screen descends along with the temperature rise, leading to visual sticking image when switching display images on the screen, eliminating visual sticking image on the screen and optimizing the display effect is currently an urgent issue in the field of display screen.

SUMMARY

The embodiments of present disclosure provide a display apparatus, a display method, a computer device, a storage medium, and an electronic product.

In a first aspect, an embodiment of the present disclosure provides a display apparatus, including a gray scale compensation apparatus for performing gray scale compensation on display data in the display apparatus, where the display apparatus includes a plurality of display regions; the gray scale compensation apparatus includes a sampling module and a processor;

the sampling module is configured to sample frame image data in a video frame sequence according to a preset sequence order, to obtain current frame image data; and the processor is configured to: determine initial gray scale compensation data according to first gray scale data of each pixel in the current frame image data and a pre-generated gray scale compensation data table; acquire gray scale compensation information of an image data set corresponding to the current frame image data, where the gray scale compensation information includes gray scale compensation coefficients of the current frame image data in respective display regions, and the image data set includes continuous multiple frames of image data sampled by the sampling module; determine target gray scale compensation data according to the gray scale compensation coefficients of the current frame image data in the respective display regions and the initial gray scale compensation data; and perform gray scale compensation on the current frame image data according to the target gray scale compensation data, to obtain compensated frame image data.

In some embodiments, the processor includes an initial gray scale determination module, a compensation coefficient determination module, and a gray scale compensation module;

the initial gray scale determination module is configured to determine the initial gray scale compensation data according to gray scale data of each sub-pixel in the current frame image data and the pre-generated gray scale compensation data table;

the compensation coefficient determination module is configured to acquire the gray scale compensation information of the image data set corresponding to the current frame image data, where the gray scale compensation information includes the gray scale compensation coefficients of the current frame image data in the respective display regions, and the image data set includes the continuous multiple frames of image data sampled by the sampling module; and the gray scale compensation module is configured to: determine the target gray scale compensation data, according to the gray scale compensation coefficients of the current frame image data in the respective display regions and the initial gray scale compensation data; and perform gray scale compensation on the current frame image data according to the target gray scale compensation data, to obtain the compensated frame image data.

In some embodiments, the processor further includes a compensation coefficient calculation module;

the compensation coefficient calculation module is configured to calculate the gray scale compensation information of the image data set corresponding to the current frame image data, according to gray scale influence information of at least one historical image data set prior to the current frame image data, a temporal weight corresponding to each of the at least one historical image data set, and a preset spatial weighting model, to obtain the gray scale compensation information of the image data set corresponding to the current frame image data;

the gray scale influence information of the historical image data set includes multi-frame comprehensive gray scale influence factors of the historical image data set corresponding to the respective display regions; and the spatial weighting model includes, for a selected target display region, temperature influence coefficients of respective display regions in a first preset region, which takes the target display region as a center thereof, on the target display region.

In some embodiments, the compensation coefficient calculation module includes a temporal statistics unit, a spatial statistics unit, and a compensation coefficient calculation unit;

the temporal statistics unit is configured to determine, for any one of the plurality of display regions, a temporal weighted gray scale influence factor of the display region, according to the multi-frame comprehensive gray scale influence factor of the historical image data set corresponding to the display region and the temporal weight corresponding to each historical image data set;

the spatial statistics unit is configured to determine, for any one of the plurality of display regions, a spatial weighted gray scale influence factor of the display region, according to the temporal weighted gray scale influence factors of the respective display regions in the first preset region, which is formed by taking the display region as the center thereof, and the spatial weighting model; and the compensation coefficient calculation unit is configured to determine the gray scale compensation coefficients of the respective display regions, according to the spatial weighted gray scale influence factors of the respective display regions.

In some embodiments, the compensation coefficient calculation module further includes a smoothing filter unit; and the smoothing filter unit is configured to perform smoothing filtering processing on the spatial weighted gray scale influence factors of the display regions, to obtain updated spatial weighted gray scale influence factors of the respective display regions, and transmit the updated spatial weighted gray scale influence factors of the display regions to the compensation coefficient calculation unit.

In some embodiments, the compensation coefficient calculation unit is specifically configured to, for the spatial weighted gray scale influence factor of any one of the plurality of display regions, map the spatial weighted gray scale influence factor of the display region to a corresponding gray scale compensation coefficient, with a preset first mapping algorithm.

In some embodiments, the compensation coefficient calculation module further includes:

an image data set processing unit, which is configured to determine, for any one of the at least one historical image data set, the multi-frame comprehensive gray scale influence factors of the historical image data set corresponding to the respective display regions, according to single-frame gray scale influence factors of respective frames of image data of the historical image data set in the respective display regions, to obtain the gray scale influence information of the historical image data set.

In some embodiments, the multi-frame comprehensive gray scale influence factor of the historical image data set corresponding to one of the plurality of display regions is equal to an average value of the single-frame gray scale influence factors of all frames of image data of the historical image data set in the same display region.

In some embodiments, the display apparatus includes X rows and Y columns of X×Y display regions, X and Y each being a positive integer;

the image data set processing unit includes X×Y third data processing units and at least one fourth data processing unit;

the third data processing units are in one-to-one correspondence with the display regions, and are each configured to sequentially accumulate the single-frame gray scale influence factors of the respective frames of image data of the historical image data set in the same display region, to determine a sum of the single-frame gray scale influence factors of the respective frames of image data of the historical image data set in the same display region; and the at least one fourth data processing unit is configured to determine the average value of the single-frame gray scale influence factors of all frames of image data of the historical image data set in the same display region, according to the sum, which is transmitted by the third data processing unit, of the single-frame gray scale influence factors of the respective frames of image data of the historical image data set corresponding to the same display region and the number of image frames in the historical image data set.

In some embodiments, the compensation coefficient calculation module further includes a single-frame image processing unit and a gray scale mapping unit;

the single-frame image processing unit is configured to obtain, for any one frame of frame image data, single-frame gray scale data corresponding to each display region, according to gray scale data of pixels in the display region of the frame image data; and the gray scale mapping unit is configured to, for the single-frame gray scale data of any one of the plurality of display regions, map the single-frame gray scale data of the display region to a corresponding single-frame gray scale influence factor, with a preset second mapping algorithm.

In some embodiments, the single-frame gray scale data of the frame image data corresponding to one of the plurality of display regions is equal to an average value of the gray scale data of all pixels of the frame image data in the display region.

In some embodiments, the display apparatus includes X rows and Y columns of X×Y display regions, X and Y each being a positive integer;

the single-frame image processing unit includes Y first data processing units and at least one second data processing unit;

each of the Y first data processing units corresponds to one column of display regions, different first data processing units correspond to different columns of display regions, and the Y first data processing units are each configured to process row by row the display regions in the frame image data to be processed;

the first data processing unit is specifically configured to sequentially accumulate gray scale data of respective rows of pixels in one of display regions corresponding to a currently processed row of display regions, to determine a sum of the gray scale data of the pixels in the display region; and the second data processing unit is configured to determine the single-frame gray scale data of the display region, according to the sum, which is transmitted by the first data processing unit, of the gray scale data of the pixels in the display region and the number of the pixels in the display region.

In some embodiments, the display apparatus further includes a first pre-processing module;

where the first pre-processing module is configured to, for any one frame of frame image data, obtain the gray scale data of each pixel according to gray scale data of sub-pixels of the pixel in the frame image data.

In some embodiments, the display apparatus further includes a first cache module, where the first cache module is provided with a circular queue structure formed by a plurality of storage spaces; and the first cache module is configured to, in response to control of a data write signal, receive the gray scale influence information, which is transmitted by the image data set processing unit, of the historical image data set, and write, based on a sequential storage manner, the received gray scale influence information of the historical image data set into one of the plurality of storage spaces in the circular queue structure.

In some embodiments, in the display apparatus, the first cache module is further configured to, after writing the received gray scale influence information of the historical image data set into one of the storage spaces in the circular queue structure, transmit, in response to control of a data read signal, the gray scale influence information in total M storage spaces in the circular queue structure to the temporal statistics unit, where the M storage spaces include one storage space which is written most recently and M-1 other storage spaces which are before, in a writing order, the one storage space which is written most recently.

In some embodiments, the display apparatus further includes a counting module, where the counting module is configured to: receive the multi-frame comprehensive gray scale influence factors, which are transmitted by the image data set processing unit, of the historical image data set corresponding to the respective display regions, where each time the multi-frame comprehensive gray scale influence factor of one display region is received, adding-one is performed; and transmit the data write signal to the first cache module, in response to a count reaching a preset threshold value; and the counting module is further configured to transmit the data read signal to the first cache module, every the data write signal is transmitted for a preset number of times.

In some embodiments, the display apparatus further includes a second cache module;

where the second cache module receives the gray scale compensation information, which is transmitted by the compensation coefficient calculation module, of the image data set, and updates and stores the gray scale compensation information; and transmits currently stored gray scale compensation information of the image data set to the compensation coefficient determination module, in response to calling information.

In a second aspect, the present disclosure provides a display method for a display apparatus, for performing gray scale compensation on display data in the display apparatus, where the display apparatus includes a plurality of display regions, the display method for the display apparatus includes:

sampling frame image data in a video frame sequence according to a preset sequence order, to obtain current frame image data; and determining initial gray scale compensation data according to first gray scale data of each pixel in the current frame image data and a pre-generated gray scale compensation data table; acquiring gray scale compensation information of an image data set corresponding to the current frame image data, where the gray scale compensation information includes gray scale compensation coefficients of the current frame image data in respective display regions, and the image data set includes continuous multiple frames of image data sampled by the sampling module; determining target gray scale compensation data according to the gray scale compensation coefficients of the current frame image data in the respective display regions and the initial gray scale compensation data; and performing gray scale compensation on the current frame image data according to the target gray scale compensation data, to obtain compensated frame image data.

In a third aspect, an embodiment of the present disclosure provides a computer device, including a processor, a memory, and a bus, where the memory stores thereon machine-readable instructions executable by the processor, the processor and the memory communicate with each other over the bus when the computer device is running, and the machine-readable instructions, when executed by the processor, perform the steps of the display method for a display apparatus according to the second aspect.

In a fourth aspect, an embodiment of the present disclosure provides a computer non-transitory readable storage medium, storing thereon a computer program which, when executed by a processor, performs the steps of the display method for a display apparatus according to the second aspect.

In a fifth aspect, an embodiment of the present disclosure provides an electronic product, including the display apparatus according to the first aspect.

BRIEF DESCRIPTION OF DRAWINGS

The accompanying drawings, which are included to provide a further understanding of the present disclosure and constitute a part of this specification, serve to explain the present disclosure together with the following detailed description, but do not constitute a limitation of the present disclosure. In the drawings.

DETAIL DESCRIPTION OF EMBODIMENTS

Figure 1:
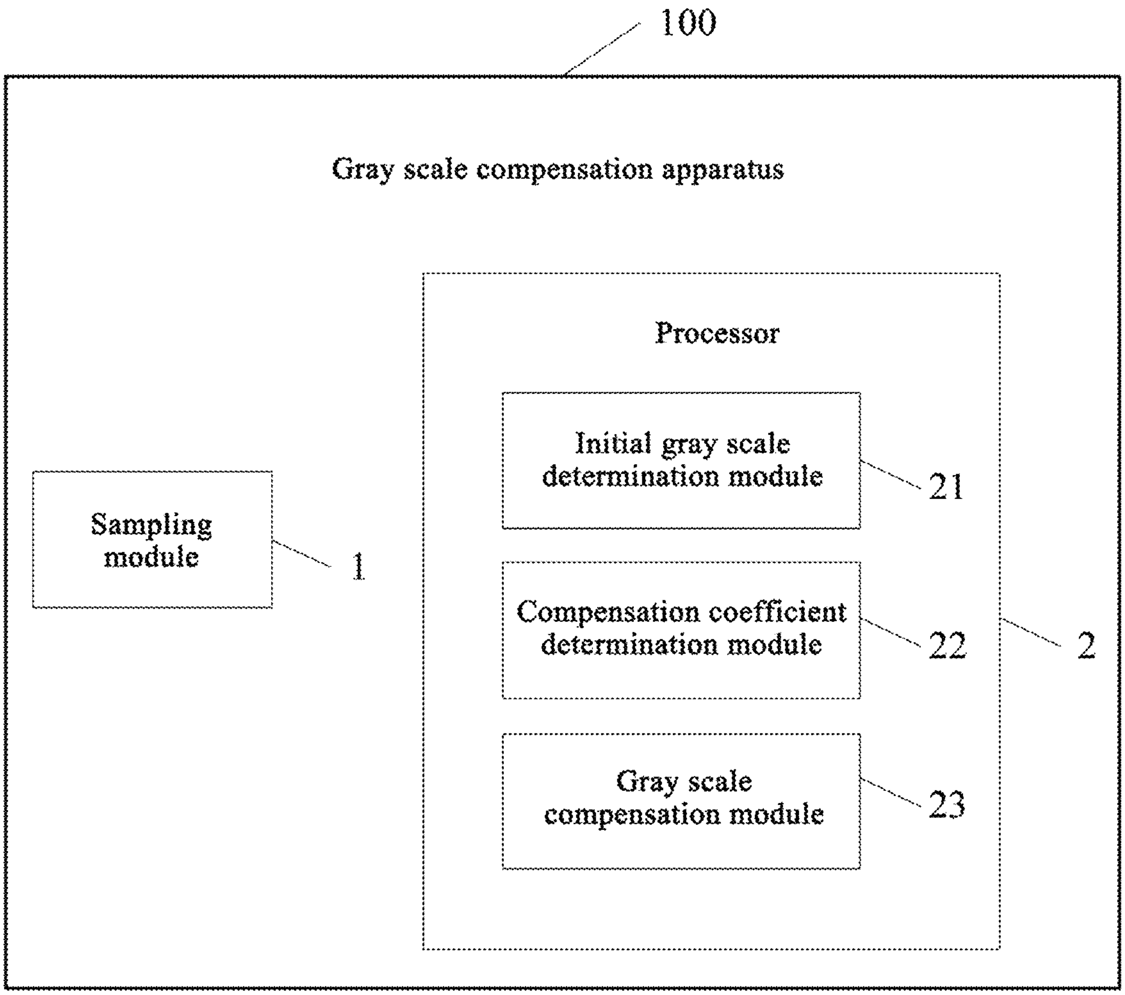
FIG. 1 is a schematic diagram illustrating a structure of a display apparatus according to an embodiment of the present disclosure.

The embodiments of the present disclosure will be described in detail below with reference to the accompanying drawings. It should be understood that the embodiments described herein are only intended to illustrate and explain the present disclosure, but not to limit the present disclosure.

In order to make the objects, technical solutions and advantages of the embodiments of the present disclosure more apparent, the technical solutions of the embodiments of the present disclosure will be clearly and completely described below with reference to the drawings of the embodiments of the present disclosure. Obviously, the described embodiments are some, but not all, embodiments of the present disclosure. All other embodiments, which can be derived by one of ordinary skill in the art from the described embodiments of the present disclosure without creative efforts, are within the protection scope of the present disclosure.

Unless defined otherwise, technical or scientific terms used in the embodiment of the present disclosure shall have the ordinary meaning as understood by one of ordinary skill in the art to which the present disclosure belongs. The term "first", "second", and the like in the present disclosure is not intended to indicate any order, quantity, or importance, but rather serves to distinguish one element from another. Also, the term "comprising", "comprises", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

The Mini/Micro Light-Emitting Diode (MLED) has advantages of high luminance, high contrast, fast response, and low power consumption, and thus, display technologies based on MLEDs are increasingly widely applied in the display field. Specifically, by integrating a high-density MLED array on a substrate, thinning, miniaturization, and matrixing of an MLED display panel are realized.

MLED products are mostly of active matrix, where each pixel can be driven to emit light continuously and independently. Compared with the traditional display panel such as a liquid crystal display panel, the MLED display panel has smaller chip size and smaller pixel spacing, so that the MLED display panel has higher heat density, and therefore, the heat dissipation requirements on the MLED display panel are higher. Based on the above technical requirements, the MLED display panel can be driven to display with a Chip-On-Glass (COG) technology. That is, the MLED chip is directly fixed onto a glass substrate, and the MLED chip is driven by a thin film transistor to emit light.

The COG technology is based on glass substrate technology, and a ultra-fine thin film transistor driving structure with a large area can be obtained by adopting semiconductor, photolithography and advanced copper technologies. However, since the MLED display panel with COG integrates high-density MLEDs and thin film transistors, and the spacing between pixels is less than 100 μm, more circuit structures such as temperature measurement device and the like cannot be formed. Therefore, it is difficult to detect the temperature of the display panel in real time to acquire temperature feedback from the display panel.

When a certain image is displayed on the MLED display panel with COG for a long time, the thin film transistor drives the MLED to be turned on for a long time, so that the temperature of the display panel rises, and the luminous efficiency of the MLED descends along with the temperature rise. MLEDs of different colors produce different luminance losses with the temperature rise, where the luminance loss of the red MLED is the largest with the temperature rise. Since the temperature feedback from the MLED display panel is difficult to acquire, and the luminance loss caused by the temperature rise of the display panel cannot be effectively compensated, when an image displayed by the display panel is switched to a next image, the content of the previous image is left on the display panel, that is, a sticking image appears, thereby affecting the display effect of the display panel.

In order to solve at least one of the above technical problems, an embodiment of the present disclosure provides a display apparatus, which includes a gray scale compensation apparatus, where the gray scale compensation apparatus may be integrated in a Field-Programmable Gate Array (FPGA) and serve to perform gray scale compensation on a display image.

FIG. 1 is a schematic diagram illustrating a structure of a display apparatus according to an embodiment of the present disclosure. As shown in FIG. 1, the embodiment of the present disclosure provides a display apparatus including a gray scale compensation apparatus for performing gray scale compensation on display data in the display apparatus, where the display apparatus includes a plurality of display regions.

Optionally, the display apparatus according to an embodiment of the present disclosure may be a splicing display screen, where the splicing display screen includes a plurality of display panels spliced with each other, and each of the display panels is divided into a plurality of display regions. The following describes the specific structure of the gray scale compensation apparatus in the splicing display screen in detail by taking the splicing display screen as an example.

The gray scale compensation apparatus includes a sampling module 1 and a processor 2. The sampling module 1 is configured to sample frame image data in a video frame sequence according to a preset sequence order, to obtain current frame image data.

It should be understood that the preset sequence order is specifically an order of playing the video frame sequence on the display apparatus. Here, the sampling manner of sampling the frame image data in the video frame sequence may be continuous sampling. Alternatively, frame skip sampling may be performed, and the specific number of skipped frames may be set empirically, which is not limited in the present disclosure.

It should be noted that, for the frame image data obtained by sampling, the current frame image data is the frame image data acquired from the video frame sequence at a current moment according to the preset sequence order.

The processor 2 is configured to: determine initial gray scale compensation data according to first gray scale data of each pixel in the current frame image data and a pre-generated gray scale compensation data table; acquire gray scale compensation information of an image data set corresponding to the current frame image data, where the gray scale compensation information includes gray scale compensation coefficients of the current frame image data in respective display regions, and the image data set includes continuous multiple frames of image data sampled by the sampling module 1; determine target gray scale compensation data according to the gray scale compensation coefficients of the current frame image data in the respective display regions and the initial gray scale compensation data; and perform gray scale compensation on the current frame image data according to the target gray scale compensation data, to obtain compensated frame image data.

The display apparatus according to an embodiment of the present disclosure includes a sampling module 1 and a processor 2, where the processor 2 divides image data acquired by the sampling module 1 into a plurality of image data sets, and determines a gray scale compensation coefficient for performing gray scale compensation on the image data by taking the image data set as a unit. Specifically, for each frame of image data in the image data set, the target gray scale compensation data is determined according to the gray scale compensation coefficient uniformly configured for each display region and the respective initial gray scale compensation data of the frame of image data. The gray scale compensation coefficient is utilized to perform gray scale compensation on the current frame image data in the display region, visual sticking image in the display region can be eliminated, uniformity and consistency of a display image can be improved, so that visual experience of a user can be improved. On one hand, compared with the method that gray scale influence of image data of a previous frame on image data of a current frame is calculated frame by frame, the gray scale compensation is performed by taking the image data set as a unit, so that the gray scale compensation coefficients of respective frames of image data in the same image data set are the same, and the calculation amount can be reduced; on the other hand, the image data set includes multiple frames of image data, and the temperature of the display apparatus is more obviously influenced by the display of the multiple frames of image data, so that the regulation and control requirements can be met, to provide effective gray scale compensation.

In some embodiments, the processor 2 includes an initial gray scale determination module 21, a compensation coefficient determination module 22, and a gray scale compensation module 23, each of which is described in detail below with reference to specific embodiments.

The initial gray scale determination module 21 is configured to determine the initial gray scale compensation data according to gray scale data of each sub-pixel in the current frame image data and the pre-generated gray scale compensation data table.

The acquired frame image data includes gray scale data of each sub-pixel in an image, and similarly, the current frame image data includes gray scale data of each sub-pixel in a current frame of image.

First grayscale data of pixels may be directly acquired. For example, the pixels in the image data are signals driven by current, and the first gray scale data corresponds to the intensity of the signals. After the current frame image data is acquired, the first gray scale data of each pixel may be directly acquired according to the detected signal intensity of the pixel in the current frame image data. Alternatively, the first gray scale data of the pixel may be determined based on gray scale data of each sub-pixel of the pixel, and specific process thereof is referred to the implementation process of a first pre-processing module 27 described below, which is not described herein.

The gray scale compensation data table may be generated in advance to be pre-generated, or may be obtained directly, which is not described in detail here.

In some embodiments, the gray scale compensation data table includes respective gray scale data, compensation data for each gray scale, and a peak luminance variation factor. The processor 2 is specifically configured to: screen out a target compensation gray scale from the gray scale compensation data table according to the first gray scale data; and determine the initial gray scale compensation data according to the target compensation gray scale and the peak luminance variation factor.

The peak luminance variation factor is a variation factor $\alpha$ under different measured peak luminance, calculated in consideration of peak luminance variation of the display apparatus, where $\alpha$=actual peak luminance/measured peak luminance, and the actual peak luminance is fixed to 400 nit and may be determined according to relevant parameters of the actual spliced screen. The gray scale compensation data table is inquired according to the first gray scale data, and a target compensation gray scale $\Delta d$ of the first gray scale data is obtained through inquiring. The peak luminance variation factor $\gamma$ is determined according to the measured peak luminance currently set for the display apparatus. Then, the inquired target compensation gray scale $\Delta d$ of the first gray scale data is multiplied by the peak luminance variation factor $\gamma$, to obtain the initial gray scale compensation data Cmax corresponding to a pixel. That is, $Cmax=\Delta d\times\gamma$.

Alternatively, in other embodiments, each gray scale data and the initial gray scale compensation data corresponding to the gray scale data are directly stored in the gray scale compensation data table. That is, the initial gray scale compensation data corresponding to the first gray scale data may be obtained directly by looking up the table.

The compensation coefficient determination module 22 is configured to acquire the gray scale compensation information of the image data set corresponding to the current frame image data, where the gray scale compensation information includes gray scale compensation coefficients of the current frame image data in the respective display regions, and the image data set includes continuous multiple frames of image data sampled by the sampling module 1.

In the embodiment of the present disclosure, gray scale compensation is performed on the frame image data, based on the gray scale compensation information of the image data set to which the frame image data belongs, and the gray scale compensation information records the gray scale compensation coefficient, which is uniformly configured for each display region, of each frame of image data in the corresponding image data set. That is, the gray scale compensation is performed on each frame of image data in the same image data set, based on the same gray scale compensation information (gray scale compensation information of the image data set, to which the frame of image data belongs).

It should be understood that the gray scale compensation information of the image data set, to which the current frame image data belongs, is pre-obtained before the current frame image data is sampled (for example, may be obtained by calculation of a compensation coefficient calculation module involved below). Therefore, when the gray scale compensation is required to be performed on the current frame image data, the gray scale compensation information to which the current frame image data belongs may be directly called.

The following description will describe how the compensation coefficient calculation module calculates the gray scale compensation information of the image data set to which the current frame image data belongs.

Figure 2:
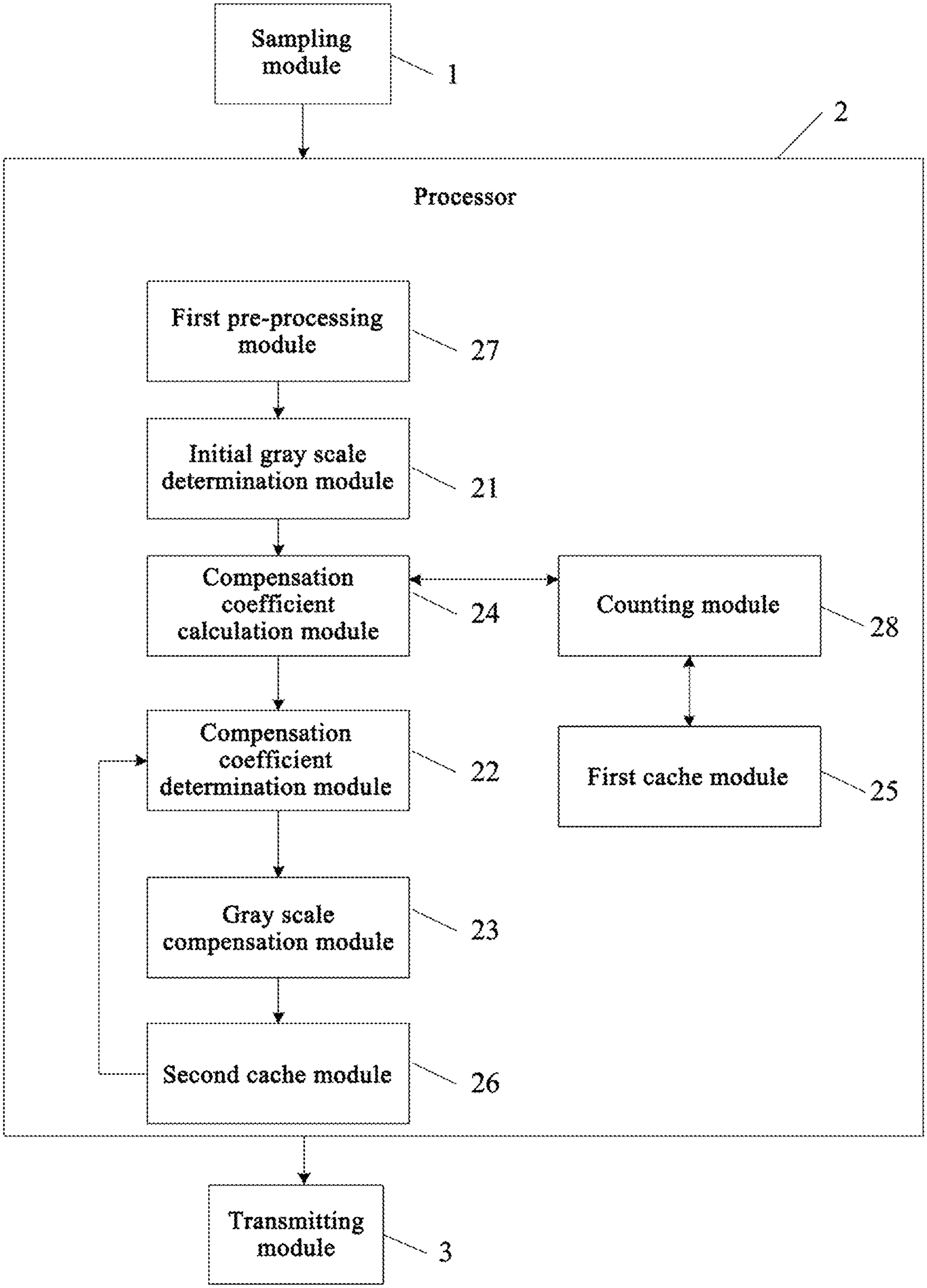
FIG. 2 is a schematic diagram illustrating a structure of another display apparatus according to an embodiment of the present disclosure.
Figure 3:
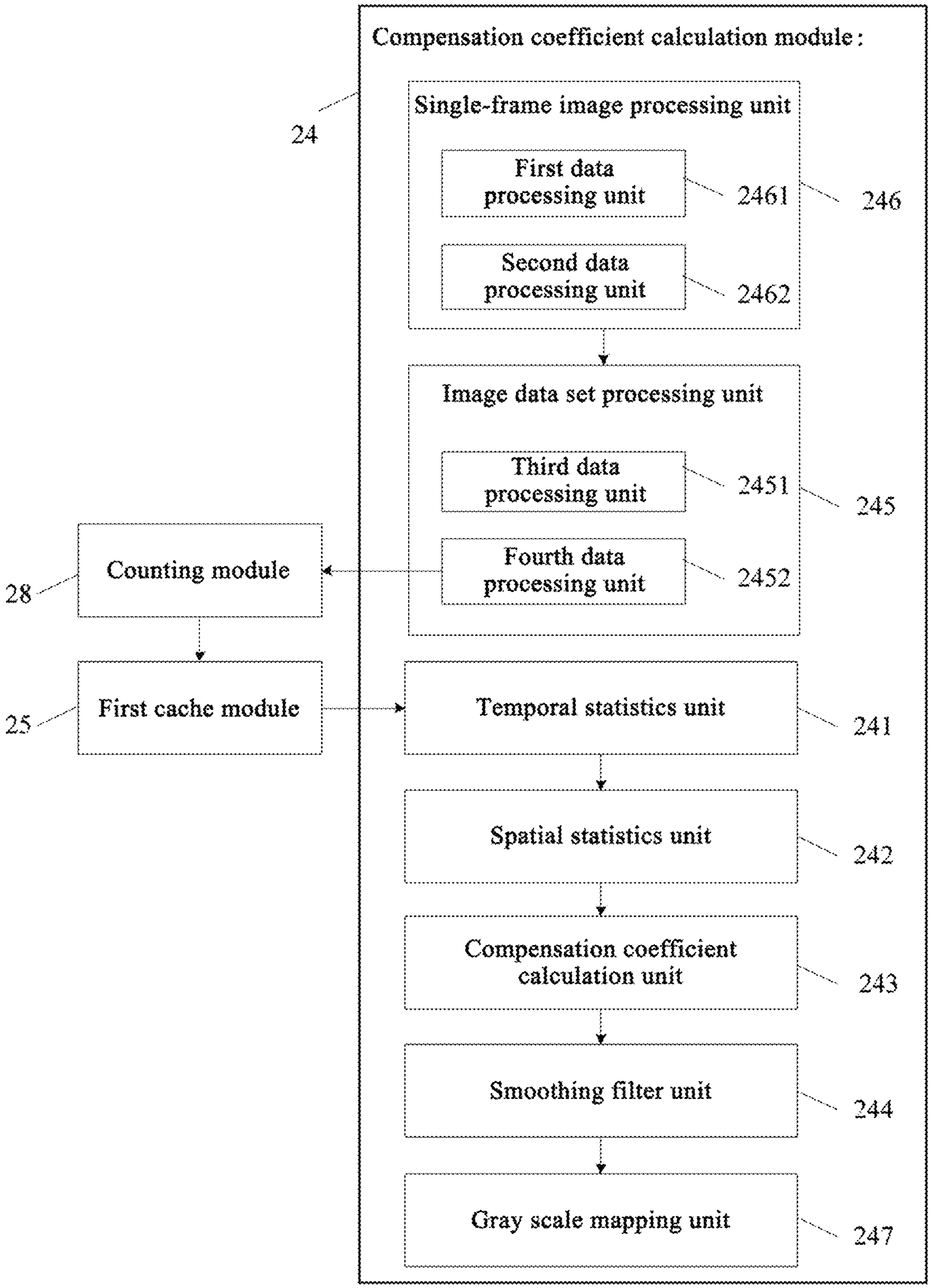
FIG. 3 is a schematic diagram illustrating a structure of a compensation coefficient calculation module according to an embodiment of the present disclosure.

FIG. 2 is a schematic diagram illustrating a structure of another display apparatus according to an embodiment of the present disclosure, and FIG. 3 is a schematic diagram illustrating a structure of a compensation coefficient calculation module according to an embodiment of the present disclosure. In some embodiments, as shown in FIGS. 2 and 3, the processor 2 further includes a compensation coefficient calculation module 24, and the compensation coefficient calculation module 24 is configured to calculate the gray scale compensation information of the image data set corresponding to the current frame image data, according to gray scale influence information of at least one historical image data set prior to the current frame image data, a temporal weight corresponding to each of the at least one historical image data set, and a preset spatial weighting model, to obtain the gray scale compensation coefficients of the image data set corresponding to the current frame image data.

The historical image data set means an image data set prior to the image data set to which the current frame image data belongs. The gray scale influence information of the historical image data set includes multi-frame comprehensive gray scale influence factors of the historical image data set corresponding to the respective display regions. The spatial weighting model includes, for a selected target display region, temperature influence coefficients of respective display regions in a first preset region, which takes the target display region as a center thereof.

In some embodiments, as shown in FIG. 2, the display apparatus further includes a transmitting module 3, where the transmitting module 3 is configured to transmit the compensated frame image data. Specifically, the transmitting module 3 may transmit the compensated frame image data to an image processing module for further image processing, such as image enhancement processing, or transmit the compensated frame image data to a display module for image displaying, which is not limited in the embodiments of the present disclosure.

In some embodiments, the compensation coefficient calculation module 24 includes a temporal statistics unit 241, a spatial statistics unit 242, and a compensation coefficient calculation unit 243.

The temporal statistics unit 241 is configured to determine, for any one display region, a temporal weighted gray scale influence factor of the display region, according to the multi-frame comprehensive gray scale influence factors of the respective historical image data sets corresponding to the display region and the temporal weights corresponding to the respective historical image data sets.

The multi-frame comprehensive gray scale influence factor of the historical image data set corresponding to the display region is equal to an average value Gray'A of single-frame gray scale influence factors of all frames of image data in the historical image data set in the same display region. The determination process thereof may be referred to the detailed description of an image data processing unit below, which is not be described in detail here.

Specifically, the temporal statistics unit 241 is deployed with a first preset algorithm, and for a selected display region, takes the multi-frame comprehensive gray scale influence factor of at least one historical image data set corresponding to the selected display region and the temporal weights corresponding to the at least one historical image data set as input data of the first preset algorithm, and outputs the temporal weighted gray scale influence factor of the image data set, to which the current frame image data belongs, corresponding to the selected display region, after processing by the first preset algorithm.

Here, the first preset algorithm may be a pre-set weighted summation algorithm. The temporal weights of respective historical image data sets are pre-set and may be directly acquired. It should be noted that a sum of the respective temporal weights is 1, that is, $\Sigma_{i=0}^{N} a_i=1$, where $a_i$ represents the temporal weight corresponding to an $i^{th}$ historical image data set, and N represents the number of the historical image data sets.

In one example, for the determination of the temporal weighted gray scale data of any one display region, the temporal statistics unit 241 is specifically configured to: perform weighted summation on a plurality of multi-frame comprehensive gray scale influence factors, according to the multi-frame comprehensive gray scale influence factors of the historical image data sets corresponding to the selected display region and the temporal weights corresponding to the respective historical image data sets, to obtain the temporal weighted gray scale influence factor of the selected display region.

Specifically, the temporal weighted gray scale data $\text{Gray}_{mean}^{A}$ of a display region A may be determined according to formula 1:

$$\text{Gray}_{mean}^{A} = \sum_{i=0}^{N} \text{Gray}_i'^{\overline{A}} * a_i, \qquad \text{formula 1}$$

where $$\text{Gray}_i'^{\overline{A}}$$

represents the multi-frame comprehensive gray scale influence factor of the $i^{th}$ historical image data set in the selected display region (for example, it may be the average value of single-frame gray scale influence factors of all frames of image data of the $i^{th}$ historical image data set in the selected display region, which will be described in detail below), and a; represents the temporal weight configured for the $i^{th}$ historical image data set.

The spatial statistics unit 242 is configured to determine, for any one display region, a spatial weighted gray scale influence factor of the display region, according to temporal weighted gray scale influence factors of respective display regions in a first preset region, which is formed by taking the display region as a center thereof, and a spatial weighting model.

In some implementations, the spatial statistics unit 242 is deployed with a second preset algorithm, and for a selected display region, takes the temporal weighted gray scale influence factors of the respective display regions in the first preset region, which is formed by taking the selected display region as a center thereof, and temperature influence coefficients (determined by the spatial weighting model) corresponding to the respective display regions in the first preset region as input data of the second preset algorithm, and then outputs the spatial weighted gray scale influence factor of the selected display region.

In some embodiments, the second preset algorithm may be a neural network algorithm that performs convolution filtering on the temporal weighted gray scale influence factors using the temperature influence coefficients.

It should be noted that the spatial weighting model is pre-generated, and has a form of an M×M filter coefficient matrix. The temperature influence coefficients are in one-to-one correspondence with the display regions in the first preset region, that is, the first preset region includes M×M display regions, and the M×M filter coefficient matrix includes the temperature influence coefficients $m_1$, $m_2$, . . . , and $m_M$. Taking the first preset region including 9×9 display regions as an example, the filter coefficient matrix includes 9×9 temperature influence coefficients.

In one example, for the determination of the spatial weighted gray scale influence factor of any one display region, the spatial statistics unit 242 is specifically configured to: perform weighted summation on the plurality of temporal weighted gray scale influence factors, according to the temporal weighted gray scale influence factors of all display regions in the first preset region, which is formed by taking the display region as the center thereof, and the temperature coefficients of all display regions in the first preset region, to obtain the spatial weighted gray scale influence factor of the selected display region.

In the same example as the above example, taking a display region C1 in a non-edge region of the display apparatus as an example, 9×9 display regions, which take the display region C1 as the center thereof, serve as the first preset region, which is beneficial for the temperature influence coefficient $m_j$ at the center of the filter coefficient matrix M×M to be aligned with the display region C1. The respective temperature influence coefficients are multiplied by the temporal weighted gray scale influence factors $Gray_{mean}$ of the corresponding display regions in the first preset region, respectively, and then are added together, to obtain the spatial weighted gray scale influence factor YA of the display region C1, specifically referring to formula 2:

$$Y_A = \sum_i^M Gray_{mean}^i \times m_i, \quad \text{formula 2}$$

where $Gray_{mean}{}^i$ represents the temporal weighted gray scale data of the $i^{th}$ display region in the first preset region corresponding to the target display region, and $m_i$ represents the temperature influence coefficient of the $i^{th}$ display region in the first preset region corresponding to the target display region.

Figure 4:
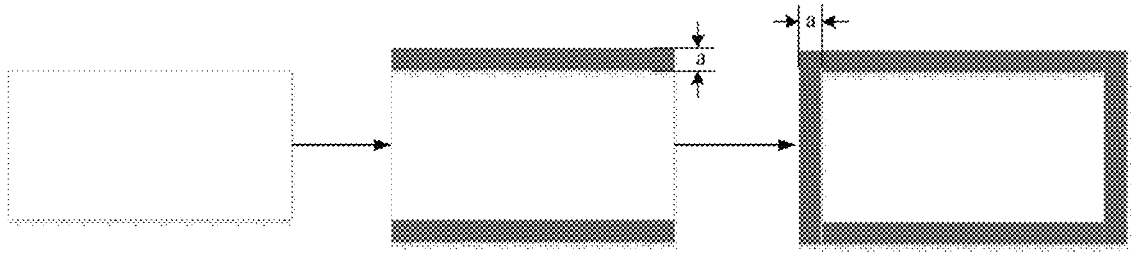
FIG. 4 is a schematic diagram of mirror-copying a display region according to an embodiment of the present disclosure.

FIG. 4 is a schematic diagram of mirror-copying a display region according to an embodiment of the present disclosure. In another example, taking a display region C2 in an edge region of the display apparatus as an example, it is insufficient to form, in the display apparatus, a first preset region which takes the display region C2 as the center thereof. The edge region refers to "a" rows of display regions at the periphery of the display apparatus in any direction, where 2a+1=M. Based on this, as shown in FIG. 4, the temporal weighted gray scale compensation coefficients of the "a" rows of display regions at the edge region of the display apparatus are mirror-copied, and supplemented for virtual display regions at the periphery of the display apparatus. Then, the respective temperature influence coefficients $M_1$, $M_2$, . . . , $m_M$ in the M×M filter coefficient matrix are multiplied by the temporal weighted gray scale influence factors $Gray_{mean}$ in the corresponding display regions, respectively, and then are added together, to obtain the spatial weighted gray scale influence factor of the display region C2, which may be specifically determined with reference to the formula 2. The repeated parts are not described again.

The compensation coefficient calculation unit 243 is configured to determine the gray scale compensation coefficients of the respective display regions, according to the spatial weighted gray scale influence factors of the respective display regions.

Specifically, the compensation coefficient calculation unit 243 is specifically configured to, for the spatial weighted gray scale influence factor of any one display region, map the spatial weighted gray scale influence factor of the display region to a corresponding gray scale compensation coefficient, with a preset first mapping algorithm.

The first mapping algorithm is a normalization algorithm, that is, the spatial weighted gray scale influence factor is mapped to a number within a range of 0 to 1, to realize standardization. The normalization of the spatial weighted gray scale influence factor may be realized by adopting a linear mapping algorithm or a nonlinear mapping algorithm, as long as it is ensured that the gray scale compensation coefficient is positively correlated with the spatial weighted gray scale influence factor, that is, the larger the spatial weighted gray scale influence factor is, the larger the gray scale compensation coefficient obtained by mapping is.

In some embodiments, the compensation coefficient calculation module 24 further includes a smoothing filter unit 244, which is configured to perform smoothing filtering processing on the spatial weighted gray scale influence factors of the display regions, to obtain updated spatial weighted gray scale influence factors of the respective display regions, and transmit the updated spatial weighted gray scale influence factors of the respective display regions to the compensation coefficient calculation unit 243.

In the embodiment of the present disclosure, the spatial weighted gray scale influence factors of the respective display regions are obtained by sequentially performing the temporal weighting processing and the spatial weighting processing, and a situation where the spatial weighted gray scale influence factors of two or more closer display regions are significantly different may occur. While in actual products, the temperature difference between closer display regions is generally smaller. Therefore, if the spatial weighted gray scale influence factors of the display regions output by the spatial statistics unit 242 are directly used for subsequent compensation, it may result in poor final compensation effect. Therefore, in the embodiment of the present disclosure, after the temporal weighting processing and the spatial weighting processing are sequentially performed, the smoothing filtering processing is performed on the spatial weighted gray scale influence factors of the respective display regions, so that the spatial weighted gray scale influence factors of the display regions vary smoothly, the situation where the spatial weighted gray scale influence factors of two or more closer display regions are significantly different is prevented from occurring, which is favorable to improving the final compensation effect.

As an alternative, in one example, for the update of the spatial weighted gray scale influence factor of any one display region, the smoothing filter unit 244 is specifically configured to: taking a target display region C3 as an example, determine the updated spatial weighted gray scale influence factor of the target display region C3, according to the spatial weighted gray scale influence factors of respective display regions in a second preset region, which is formed by taking the display region C3 as a center thereof, and a preset smoothing filter kernel.

The smoothing filter kernel records filtering weights configured for the respective display regions in the second preset region. Through performing weighted summation processing on the spatial weighted gray scale influence factors of the display regions in the second preset region, smoothing filtering is realized for the target display region C3.

As an example, the smoothing filtering may be mean filtering, in which case the smoothing filter kernel is a mean filter kernel. Taking the mean filter kernel being an N×N array as an example, each filtering weight in the N×N array is 1/(N×N).

It should be noted that using the mean filtering as the smoothing filtering in the present disclosure is only an optional implementation in the present disclosure, and any smoothing filtering algorithm may be used to implement the smoothing filtering processing in the present disclosure. The smoothing filtering algorithm is not limited in the technical solution in the present disclosure.

Similarly to the above example, in a case where the display region C3 subjected to the smoothing filtering processing is located in the edge region of the display apparatus and it is insufficient to form, in the display apparatus, the second preset region which takes the display region C3 as the center thereof, the spatial weighted gray scale compensation coefficients of "b" rows of display regions in the edge region of the display apparatus are mirror-copied, and supplemented for virtual display region at the periphery of the display apparatus, where 2b+1=N. Then, the smoothing filtering processing is performed on the display region C3.

By performing smoothing filtering processing on the updated spatial weighted gray scale influence factors of the respective display regions in the display apparatus, a transition between the spatial weighted gray scale influence factors of the display regions can be smooth, and the final compensation effect can be improved.

It should be noted that, the case of providing the smoothing filter unit 244 in the embodiment of the present disclosure is an optional implementation in the present disclosure, and the smoothing filter unit 244 may alternatively not be included in the present disclosure. It should be understood that, where the smoothing filter unit 244 is provided, the spatial weighted gray scale influence factor acquired in the compensation coefficient calculation unit 243 is an updated spatial weighted gray scale influence factor obtained through the smoothing filtering processing.

In some embodiments, the compensation coefficient calculation module 24 further includes a single-frame image processing unit 246 and a gray scale mapping unit 247.

The single-frame image processing unit 246 is configured to obtain, for any one frame of frame image data, single-frame gray scale data corresponding to each display region, according to gray scale data of pixels in the display region of the frame image data.

In some embodiments, the display apparatus includes X rows and Y columns of X×Y display regions, X and Y each being positive integers. The single-frame image processing unit 246 includes Y first data processing units 2461 and at least one second data processing unit 2462. One first data processing units 2461 corresponds to one column of display regions, and different first data processing units 2461 correspond to different columns of display regions. The Y first data processing units 2461 are configured to process row by row the display regions in the frame image data to be processed.

The first data processing unit 2461 is specifically configured to sequentially accumulate gray scale data of respective rows of pixels in a display region corresponding to a currently processed row of display regions, to determine a sum of the gray scale data of the pixels in the display region.

Figure 5:
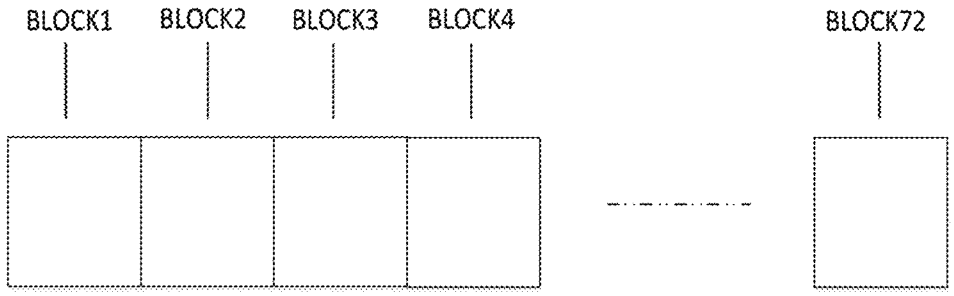
FIG. 5 is a schematic diagram illustrating a structure of a first storage space according to an embodiment of the present disclosure.

FIG. 5 is a schematic diagram illustrating a structure of a first storage space according to an embodiment of the present disclosure. As shown in FIG. 5, Y first storage spaces in one-to-one correspondence with the first data processing units 2461 are preset. Taking a value of Y being 72 as an example, 72 first storage spaces BLOCK1 to BLOCK72 are set in this case.

Processing Y display regions in a first row of display regions in the display apparatus is taken as an example, each display region includes h rows and w columns of h×w pixels.

The process of the Y first data processing units 2461 processing the Y display regions in the first row of display regions in the display apparatus is roughly as follows.

Firstly, each first data processing unit 2461 is configured to accumulate gray scale data of a first row of pixels in a display region of the first row and a corresponding column, to obtain first accumulated data, and respectively stores the first accumulated data obtained by the first data processing unit 2461 to a corresponding first storage space. Next, each first data processing unit 2461 accumulates gray scale data of a second row of pixels in the display region of the first row and the corresponding column, to obtain a gray scale data accumulation result of each second row of pixels. Then, each first data processing unit 2461 reads out the pre-stored first accumulated data from the corresponding first storage space, and sums the gray scale data accumulation result of the corresponding second row of pixels and the read out first accumulated data, to obtain second accumulated data (i.e. a sum of the gray scale data of the first two rows of pixels in the corresponding display region). And so on, the accumulation process for the gray scale data of other rows of pixels is repeated, until a gray scale data accumulation result of an $h^{th}$ row of pixels in the corresponding display region and an $(h-1)^{th}$ accumulated data (a sum of the gray scale data of the previous h−1 rows of pixels in the corresponding display region) is summed, and a sum of the gray scale data of all the pixels in the corresponding display region is obtained.

After the Y first data processing units 2461 complete summing the gray scale data of all the pixels in the display regions corresponding to the first row, respectively, the sum result is transmitted to the second data processing unit 2462 for the second data processing unit to perform subsequent processing. At the same time, each first storage space is written "0". Next, the Y first data processing units 2461 may perform the aforementioned summation processing on the Y display regions of the second row, respectively, and transmit the corresponding results to the second data processing unit 2462.

The above process is repeated until the Y first data processing units 2461 finish processing X rows of Y display regions. At this time, the Y first data processing units 2461 complete the processing of the entire one frame of image data.

The second data processing unit 2462 is configured to determine the single-frame gray scale data of the display region, according to a sum, which is transmitted by the first data processing unit 2461, of the gray scale data of the pixels in the display region and the number of the pixels in the display region.

Here, the single-frame gray scale data of the display region is the sum of the gray scale data divided by the number of the pixels in the display region. That is, the single-frame gray scale data of the frame image data corresponding to a display region is equal to an average value of the gray scale data of all the pixels of the frame image data in the display region.

In the embodiment of the present disclosure, there may be one or more second data processing units 2462, which is not limited by the present disclosure.

The gray scale mapping unit 247 is configured to, for the single-frame gray scale data of any one display region, map the single-frame gray scale data of the display region to a corresponding single-frame gray scale influence factor, with a preset second mapping algorithm.

The single-frame gray scale influence factor serves to represent an influence of a gray scale on temperature, and generally, the higher the gray scale is, the higher the generated temperature is. A linear mapping algorithm or a non-linear mapping algorithm may be adopted to map the single-frame gray scale data to the corresponding single-frame gray scale influence factor, as long as it is ensured that the single-frame gray scale influence factor is positively correlated with the single-frame gray scale data, that is, the larger the single-frame gray scale data is, the larger the single-frame gray scale influence factor obtained through mapping is.

As an example, a value of the single-frame gray scale data ranges from 0 to 255, and the single-frame gray scale data may be mapped to an integer ranging from 0 to 1023 (i.e., the single-frame gray scale influence factor r is an integer ranging from 0 to 1023). By the mapping process, the subsequent encoding and processing are facilitated (the integer in a range of 0 to 1023 may be encoded and represented by 10 bits).

Furthermore, where the value of the single-frame gray scale influence factor is an integer ranging from 0 to 1023, the first mapping algorithm may specifically be dividing the spatial weighted gray scale influence factor by 1023, to ensure that the calculated gray scale compensation coefficient is always in a range from 0 to 1.

In some embodiments, the compensation coefficient calculation module 24 further includes an image data set processing unit 245, which is configured to determine, for any one historical image data set, the multi-frame comprehensive gray scale influence factors of the historical image data set corresponding to the respective display regions, according to the single-frame gray scale influence factors of respective frames of image data of the historical image data set in the respective display regions, to obtain gray scale influence information of the historical image data set.

Specifically, the display apparatus includes X rows and Y columns of X×Y display regions, where X and Y are positive integers. The image data set processing unit 245 includes X×Y third data processing units 2451 and at least one fourth data processing unit 2452.

The third data processing units 2451 are in one-to-one correspondence with the display regions, and are each configured to sequentially accumulate the single-frame gray scale influence factors of the respective frames of image data of the historical image data set corresponding to a same display region, to determine a sum of the single-frame gray scale influence factors of the respective frames of image data of the historical image data set corresponding to the same display region.

The fourth data processing unit 2452 is configured to determine an average value of the single-frame gray scale influence factors of all frames of image data of the historical image data set in the same display region, according to the sum, which is transmitted by the third data processing units 2451, of the single-frame gray scale influence factors of the respective frames of image data in the historical image data set corresponding to the same display region, and the number of image frames in the historical image data set, to obtain the temporal weighted influence factor corresponding to the display region.

Figure 6:
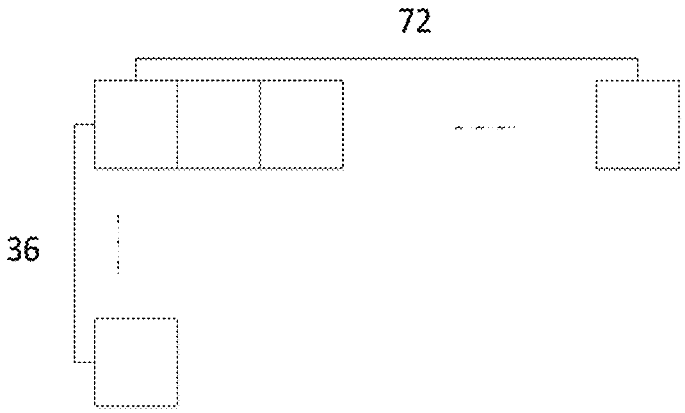
FIG. 6 is a schematic diagram illustrating a structure of a second storage space according to an embodiment of the present disclosure.

FIG. 6 is a schematic diagram illustrating a structure of a second storage spaces according to an embodiment of the present disclosure. As shown in FIG. 6, X×Y second storage spaces in one-to-one correspondence with the display regions are preset, and any two of the third data processing units 2451, the display regions, and the second storage spaces are in one-to-one correspondence.

Taking X being 36 and Y being 72 as an example, 36×72 second storage spaces are set (each small box in FIG. 6 represents one second storage space).

Taking one third data processing unit 2451 calculating the sum of the single-frame gray scale influence factors of the respective frames of image data of the historical image data set corresponding to a corresponding display region, based on the corresponding second storage space, as an example, the process is roughly as follows.

Firstly, the third data processing unit 2451 receives the single-frame gray scale influence factor of a first frame of image data of the historical image data set in a corresponding display region, and then stores the single-frame gray scale influence factor in a corresponding second storage space. Then, the third data processing unit 2451 receives the single-frame gray scale influence factor of a second frame of image data of the historical image data set in the corresponding display region, sums the received single-frame gray scale influence factor with the single-frame gray scale influence factor, which is stored in the second storage space, of the first frame of image data of the historical image data set in the corresponding display region, to obtain an accumulation result of the single-frame gray scale influence factors of the first two frames image data of the historical image data set in the corresponding display region, and stores the accumulation result in the corresponding second storage space, to update the data stored in the second storage space. Then, the third data processing unit 2451 receives the single-frame gray scale influence factor of a third frame of image data of the historical image data set in the corresponding display region, sums the received single-frame gray scale influence factor with the accumulation result of the single-frame gray scale influence factor of the first two frames of image data stored in the second storage space in the corresponding display region to obtain the accumulation result of the single-frame gray scale influence factor of the first three frames of image data in the historical image data set in the corresponding display region, and stores the accumulation result in the corresponding second storage space for storage, to update the data stored in the second storage space. And so on, the above accumulation process is repeated for other frames of image data of the historical image data set, until the single-frame gray scale influence factor of a last frame of image data of the historical image data set in the corresponding display region and the accumulation result, which is stored in the second storage space, of the single-frame gray scale influence factors of previous multiple frames of image data of the corresponding display region is summed, and a sum of the single-frame gray scale influence factors of the respective frames of image data of the historical image data set in the corresponding display region is obtained.

After the X×Y third data processing units 2451 each obtain, through calculation, the sum of the single-frame gray scale influence factors of the respective frames of image data of the historical image data set corresponding to the display region, the sum result is transmitted to the fourth data processing unit 2452 for subsequent processing. At the same time, each second storage space is written "0", for processing the next image data set.

In some embodiments, the display apparatus further includes a first pre-processing module 27. The first pre-processing module 27 is configured to, for any one frame of frame image data, obtain gray scale data of each pixel according to gray scale data of sub-pixels of the pixel in the frame image data.

It should be noted that the pixel in the image includes three sub-pixels, for example, the three sub-pixels are a red sub-pixel, a green sub-pixel, and a blue sub-pixel. The red sub-pixel, the green sub-pixel and the blue sub-pixel correspond to three channels of the pixel, respectively. That is, the red sub-pixel corresponds to a red channel R, the green sub-pixel corresponds to a green channel G, and the blue sub-pixel corresponds to a blue channel B. The pixel information of the sub-pixel may be a channel value of a channel corresponding to the sub-pixel, that is, a red channel value r corresponding to the red channel R, a green channel value g corresponding to the green channel G, and a blue channel value b corresponding to the blue channel B.

In some examples, given that a gray scale ratio between the red, green, and blue sub-pixels is R:G:B=$\alpha 1:\alpha 2:\alpha 3$, and the channel values of the sub-pixels are denoted as r, g, and b, the first gray scale data is obtained by weighted summation of the channel values of the three channels R, G and B according to the gray scale ratio, that is, $\alpha 1\times r+\alpha 2\times g+\alpha 3\times b$. The gray scale ratio between the respective sub-pixels may be preset and may be directly acquired.

In some embodiments, the single-frame gray scale data of the frame image data corresponding to a display region is equal to an average value of the gray scale data of all the pixels of the frame image data in the display region.

The historical frame image data is displayed throughout the display apparatus. The historical frame image data in a display region A includes h×w pixels, where the gray scale data of pixel (x, y) is denoted as $Gray^{(x,y)}$, the single-frame gray scale data in the display region A is denoted as $Gray'^{A}$, $$Gray'^{A} = \frac{1}{h \times w}\sum_{x=1,y=1}^{(h,w)} Gray^{(x,y)},$$

where $x\in[1, h]$, and $y\in[1, w]$.

The gray scale compensation module 23 is configured to: determine the target gray scale compensation data, according to the gray scale compensation coefficients of the current frame image data in respective display regions and the initial gray scale compensation data; and perform gray scale compensation on the current frame image data according to the target gray scale compensation data, to obtain the compensated frame image data.

In some implementations, the gray scale compensation module 23 is configured to determine the target gray scale compensation data for each pixel, according to the initial gray scale compensation data Cmax and gray scale compensation coefficient S of the pixel. For the determination of the target gray scale data of a pixel (x, y), the initial gray scale compensation data $Cmax^{(x,y)}$ corresponding to the pixel may be multiplied by the gray scale compensation coefficient $S^{(x,y)}$ of the pixel, to obtain the target gray scale compensation data $d_{target}^{(x,y)}$ of the pixel (x, y), which may be referred to formula 3 for details:

$$d_{target}^{(x,y)} = S^{(x,y)} \times Cmax^{(x,y)}. \quad \text{formula 3}$$

In some examples, in order to improve the uniformity and consistency of gray scale compensation, each sub-pixel of each pixel in the current frame image data is compensated, where the red channel value is $r'=r-d_{target}^{(x,y)}$, the green channel value is $g'=g-d_{target}^{(x,y)}$ and the blue channel value is $b'=b-d_{target}^{(x,y)}$, that is, the updated channel values of the three channels RGB of the pixel are obtained. In this case, the updated three channel values are the compensated frame image data. Each pixel in the current frame image data is compensated according to the above method, to obtain the compensated frame image data.

In some examples, due to the inherent characteristics of the R channel, in which the temperature varies significantly, the gray scale has the greatest attenuation in the R channel. In order to improve the efficiency of data processing, the target gray scale compensation data $d_{target}^{(x,y)}$ is subtracted from the R channel of each pixel in the current frame image data, to obtain the updated data of the R channel of the pixel, and then the updated three channels RGB of the pixel (where the values of channel G and channel B remain unchanged) are obtained. In this case, the updated three channel values are the compensated image data. Each pixel in the current frame image data is compensated according to the above method, to obtain the compensated frame image data.

Figure 7:
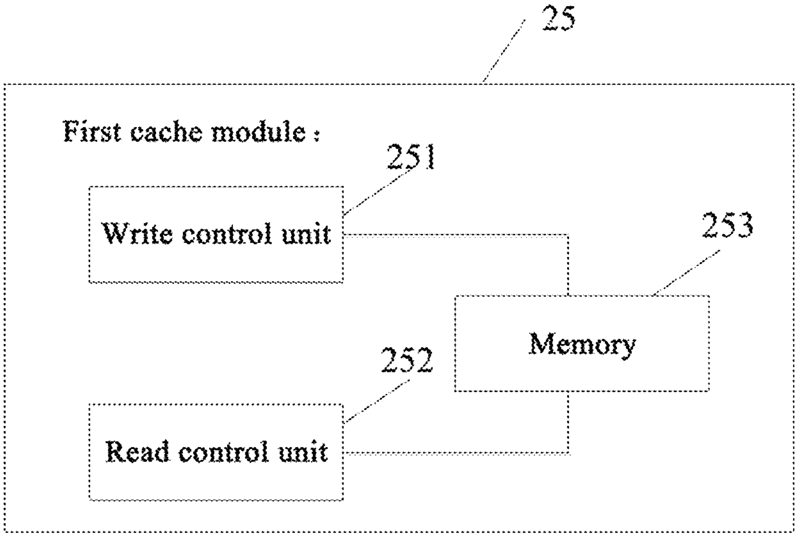
FIG. 7 is a schematic diagram illustrating a structure of a first cache module according to an embodiment of the present disclosure.

In some embodiments, the display apparatus further includes a first cache module 25, where the first cache module 25 is provided with a circular queue structure formed by a plurality of storage spaces. FIG. 7 is a schematic diagram illustrating a structure of the first cache module 25 according to an embodiment of the present disclosure. As shown in FIG. 7, the first cache module 25 includes a write control unit 251, a read control unit 252, and a memory 253. The write control unit 251 is configured to, in response to control of a data write signal, receive the gray scale influence information, which is transmitted by the image data set processing unit 245, of the historical image data set, and write, based on a sequential storage manner, the received gray scale influence information of the historical image data set into one storage space in the circular queue structure.

The first cache module 25 may be a DDR (Double Data Rate, double rate synchronous dynamic random first cache module 25). For example, the first cache module 25 is a DDR for reading and writing video signals, and may be made of semiconductor devices, which can transfer data twice in one clock cycle, and is characterized by a fast data reading rate. Specifically, for respective frames of historical frame image data in the N frames of historical frame image data, the DDR is configured to write, through a bus protocol interface, the received average value of the single-frame gray scale influence factors of the historical frame image data in each display region.

The display apparatus further includes a counting module 28, which is provided with a counter 281. The counting module is configured to receive multi-frame comprehensive gray scale influence factors, which are transmitted by the image data set processing unit (the fourth data processing unit), of the historical image data set corresponding to the respective display regions, where each time the multi-frame comprehensive gray scale influence factor of one display region is received, adding one is performed. When the count reaches a preset threshold value, the data write signal is transmitted to the write control unit in the first cache module. The counting module is further configured to transmit the data read signal to the read control unit in the first cache module, every the data write signal is transmitted for a preset number of times.

Specifically, the same as the previous example, the value of the single-frame gray scale influence factor is an integer ranging from 0 to 1023, the data bit width of each of the single-frame gray scale influence factors and an average value thereof is 10 bits, and the data bit width of the data received by the storage space in the first cache module 25 is 256 bits. Therefore, when the average value of the single-frame gray scale influence factors of the historical frame image data in each display region is received, the counting module 28 firstly performs an operation of complementing "0", to adjust the data bit width of the average value of the single-frame gray scale influence factors from 10 bits to 16 bits. When the average values, which are transmitted by the second storage space, of the single-frame gray scale influence factors corresponding to 16 display regions are received, 16 pieces of data each with a bit width of 16 bits, totally 256 bits, are stored in the adaptive module at this time, and the counter 281 in the counting module 28 triggers the data write signal. The write control unit 251 receives gray scale influence information of the historical image data set, that is, the average values of the single-frame gray scale influence factors corresponding to the 16 display regions, in response to the control of the data write signal.

Furthermore, when the counter 281 in the counting module 28 triggers the data write signal for multiple times, until the average values of the single-frame gray scale influence factors corresponding to all the display regions are written into the memory 253. Then, the counter 281 triggers a data read signal, and the read control unit 252 transmits, in response to the control of the data read signal, gray scale influence information in total M storage spaces in the circular queue structure to the temporal statistics unit 241, where the M storage spaces include one storage space which is written most recently and M-1 other storage spaces which are before, in a writing order, the one storage space which is written most recently.

Since the first cache module is a circular queue structure, new gray scale influence information can be continuously written in the structure, and the M pieces of gray scale influence information including the current latest written information are transmitted to the temporal statistics unit 241. That is, when the $M^{th}$ piece of information is written, the previous M-1 pieces of information are still stored in respective storage spaces without being read out. Meanwhile, in the process of circular writing, the gray scale influence information in the latest updated M storage spaces is ensured to be transmitted to the temporal statistics unit 241, to improve the accuracy of gray scale compensation.

In some embodiments, the display apparatus further includes a second cache module 26. The second cache module 26 receives the gray scale compensation information, which is transmitted by the compensation coefficient calculation module 24, of the image data set, and updates and stores the gray scale compensation information. In addition, the second cache module 26 transmits the currently stored gray scale compensation information of the image data set to the compensation coefficient determination module 22, in response to calling information.

Based on the same inventive concept, an embodiment of the present disclosure further provides a display method for a display apparatus, and a principle of solving a problem by the display method for the display apparatus in the embodiment of the present disclosure is similar to the principle of solving the problem by the above display apparatus in the embodiment of the present disclosure.

Figure 8:
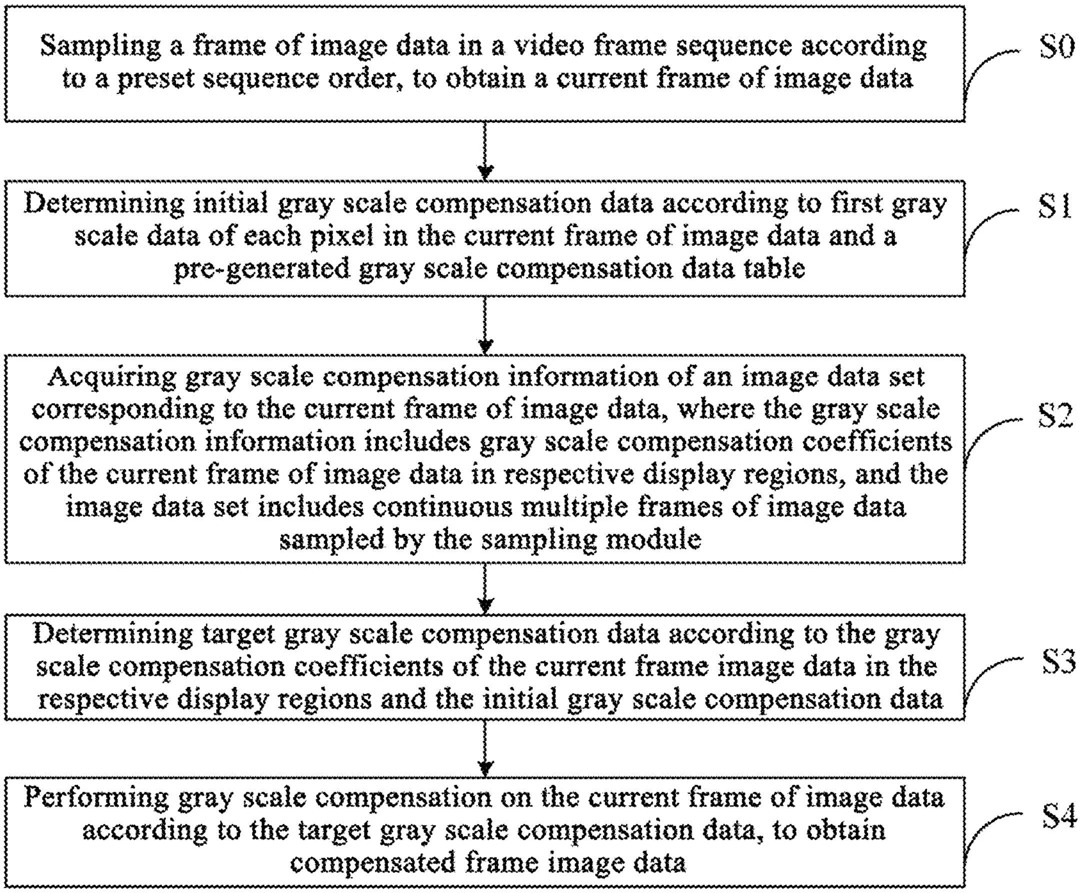
FIG. 8 is a schematic flowchart of a display method for a display apparatus according to an embodiment of the present disclosure.

A subject to execute the display method for the display apparatus according to the embodiment of the present disclosure is generally a computer device with certain computing power. In some possible implementations, the display method for the display apparatus may be implemented by the processor 2 calling computer readable instructions stored in a memory. Specifically, the display method for the display apparatus according to the embodiment of the present disclosure is applied to gray scale compensation on display data in the display apparatus including a plurality of display regions. FIG. 8 is a schematic flowchart of a display method for a display apparatus according to an embodiment of the present disclosure. As shown in FIG. 8, the display method includes the following steps S0 to S4.

S0, sampling frame image data in a video frame sequence according to a preset sequence order, to obtain current frame image data.

The specific process of performing gray scale compensation on the sampled current frame image data to obtain compensated frame image data is described in detail below, which includes the following steps S1 to S4.

S1, determining initial gray scale compensation data according to first gray scale data of each pixel in the current frame image data and a pre-generated gray scale compensation data table.

S2, acquiring gray scale compensation information of an image data set corresponding to the current frame image data, where the gray scale compensation information includes gray scale compensation coefficients of the current frame image data in respective display regions, and the image data set includes continuous multiple frames of image data sampled by the sampling module 1.

S3, determining target gray scale compensation data according to the gray scale compensation coefficients of the current frame image data in the respective display regions and the initial gray scale compensation data.

S4, performing gray scale compensation on the current frame image data according to the target gray scale compensation data, to obtain compensated frame image data.

Figure 9:
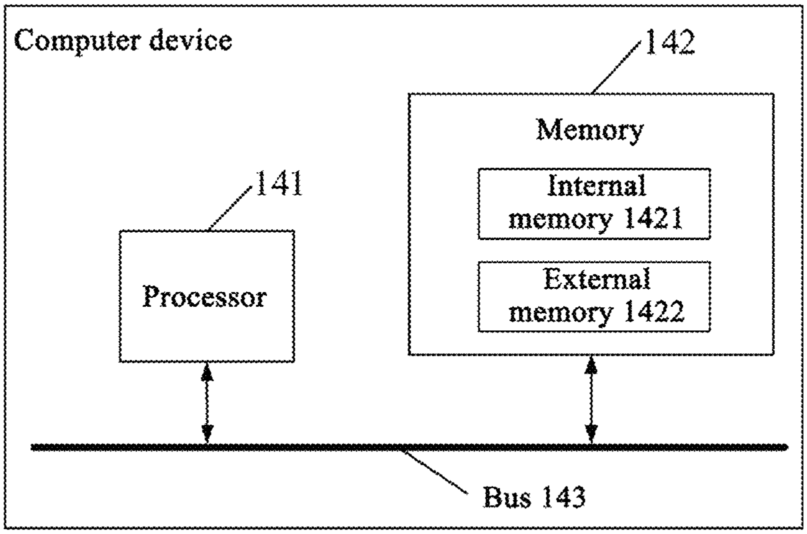
FIG. 9 is a schematic diagram illustrating a structure of a computer device according to an embodiment of the present disclosure.

Based on the same inventive concept, an embodiment of the present disclosure further provides a computer device. Referring to FIG. 9, which is a schematic diagram illustrating a structure of a computer device according to an embodiment of the present disclosure, the computer device includes a processor 2141, a memory 142, and a bus 143.

The memory 142 stores thereon machine-readable instructions executable by the processor 2141, and the processor 2141 is configured to execute the machine-readable instructions stored in the memory 142. When the machine-readable instructions are executed by the processor 2141, the processor 2141 executes respective steps of the display method for a display apparatus.

The storage 142 includes an internal memory 1421 and an external memory 1422. The internal memory 1421 is also called an internal storage, and serves to temporarily storing operation data in the processor 2131 and data exchanged with the external memory 1422 such as a hard disk. The processor 2141 exchanges data with the external memory 1422 through the internal memory 1421. When the computer device is running, the processor 2141 and the memory 142 communicate with each other through the bus 143, so that the processor 2141 executes the execution instructions mentioned in the above method embodiments.

In a fourth aspect, the present disclosure further provides a computer non-transitory readable storage medium, storing thereon a computer program which, when executed by the processor 2, performs the steps of the display method for the display apparatus described in the above method embodiment. The storage medium may be a volatile or non-volatile computer non-transitory readable storage medium.

In a fifth aspect, an embodiment of the present disclosure further provides an electronic product including the display apparatus according to any one in the first aspect.

Figure 10:
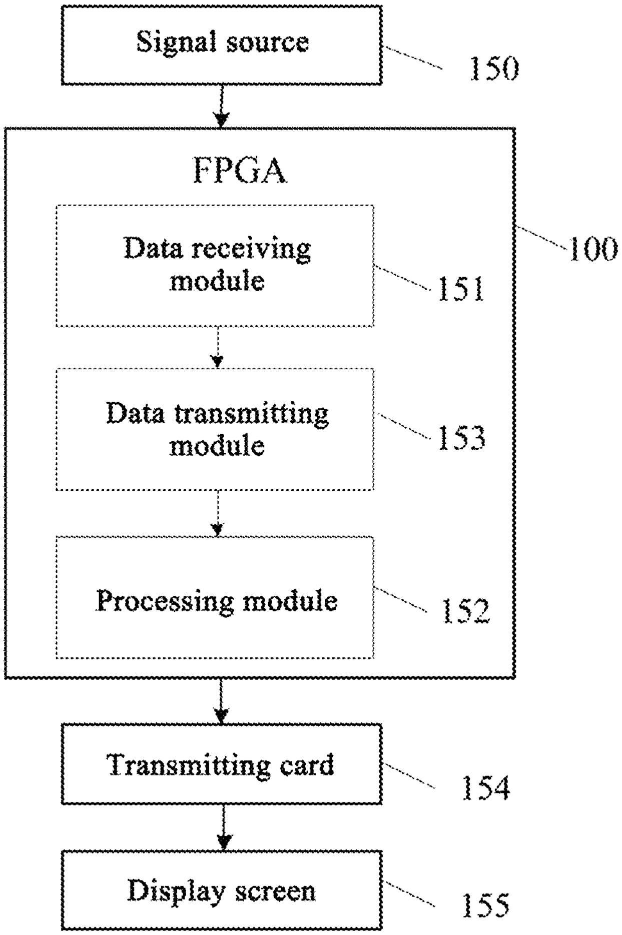
FIG. 10 is a schematic diagram illustrating a structure of an electronic product according to an embodiment of the present disclosure.

FIG. 10 is a schematic diagram illustrating a structure of an electronic product according to an embodiment of the present disclosure. In some embodiments, the gray scale compensation apparatus 100 may be integrated in an FPGA for gray scale compensation of a display screen. As shown in FIG. 10, a signal source 150 emits a video signal (i.e. frame image data) in a video frame sequence. The signal source 150 transmits the frame image data to the FPGA, gray scale compensation is then performed on the current frame image data with the FPGA, the compensated frame image data is transmitted to a transmitting card 154, and the compensated frame image data is transmitted with the transmitting card 154 to a display screen 155 for display. The display screen 155 may be a spliced screen.

As shown in FIG. 10, the FPGA includes a data receiving module 151, a processing module 152, and a data transmitting module 153, where the data receiving module 151 and the data transmitting module 153 receive and transmit data under the control of the processing module 152, respectively. Specifically, where the image compensation apparatus 100 is integrated in the FPGA, the function of the sampling module 1 may be implemented by the data receiving module 151, the function of the processor 2 may be implemented by the processing module 152, and the function of the transmitting module 3 may be implemented by the data transmitting module 153.

It should be further noted that the transmitting card 154 is configured to perform image processing on the compensated frame image data, such as image detail enhancement, image distortion correction, and the like. In addition, the transmitting card 154 may include a plurality of transmitting sub-cards, and the number of the transmitting sub-cards in an operating state is determined according to the data size of the compensated frame image data.

The electronic product including the gray scale compensation apparatus 100 according to the embodiment of the present disclosure can solve the temperature difference sticking image displayed by a mini LED, improve the acceptance of a user on image display, and can be applied to COG glass substrate products and the like. COG (Chip On Glass) means that an LED chip is directly die-bonded to a glass substrate, and LED display is driven by thin film transistors.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and scope of the present disclosure, and these changes and modifications are to be considered within the scope of the present disclosure.

What is claimed is:

1. A display apparatus, comprising a gray scale compensation apparatus for performing gray scale compensation on display data in the display apparatus, wherein the display apparatus comprises a plurality of display regions; the gray scale compensation apparatus comprises a sampling module and a processor;

the sampling module is configured to sample frame image data in a video frame sequence according to a preset sequence order, to obtain current frame image data; and the processor is configured to: determine initial gray scale compensation data according to first gray scale data of each pixel in the current frame image data and a pre-generated gray scale compensation data table; acquire gray scale compensation information of an image data set corresponding to the current frame image data, where in the gray scale compensation information comprises gray scale compensation coefficients of the current frame image data in respective display regions, and the image data set comprises continuous multiple frames of image data sampled by the sampling module;

determine target gray scale compensation data according to the gray scale compensation coefficients of the current frame image data in the respective display regions and the initial gray scale compensation data; and perform gray scale compensation on the current frame image data according to the target gray scale compensation data, to obtain compensated frame image data.

2. The display apparatus according to claim 1, wherein the processor comprises an initial gray scale determination module, a compensation coefficient determination module, and a gray scale compensation module;

the initial gray scale determination module is configured to determine the initial gray scale compensation data according to gray scale data of each sub-pixel in the current frame image data and the pre-generated gray scale compensation data table;

the compensation coefficient determination module is configured to acquire the gray scale compensation information of the image data set corresponding to the current frame image data, wherein the gray scale compensation information comprises the gray scale compensation coefficients of the current frame image data in the respective display regions, and the image data set comprises the continuous multiple frames of image data sampled by the sampling module; and the gray scale compensation module is configured to: determine the target gray scale compensation data, according to the gray scale compensation coefficients of the current frame image data in the respective display regions and the initial gray scale compensation data; and perform gray scale compensation on the current frame image data according to the target gray scale compensation data, to obtain the compensated frame image data.

3. The display apparatus according to claim 2, wherein the processor further comprises a compensation coefficient calculation module;

the compensation coefficient calculation module is configured to calculate the gray scale compensation information of the image data set corresponding to the current frame image data, according to gray scale influence information of at least one historical image data set prior to the current frame image data, a temporal weight corresponding to each of the at least one historical image data set, and a preset spatial weighting model, to obtain the gray scale compensation coefficients of the image data set corresponding to the current frame image data;

the gray scale influence information of the historical image data set comprises multi-frame comprehensive gray scale influence factors of the historical image data set corresponding to the respective display regions; and the spatial weighting model comprises, for a selected target display region, temperature influence coefficients of respective display regions in a first preset region, which takes the target display region as a center thereof, on the target display region.

4. The display apparatus according to claim 3, wherein the compensation coefficient calculation module comprises a temporal statistics unit, a spatial statistics unit, and a compensation coefficient calculation unit;

the temporal statistics unit is configured to determine, for any one of the plurality of display regions, a temporal weighted gray scale influence factor of the display region, according to the multi-frame comprehensive gray scale influence factor of the historical image data set corresponding to the display region and the temporal weight corresponding to each historical image data set;

the spatial statistics unit is configured to determine, for any one of the plurality of display regions, a spatial weighted gray scale influence factor of the display region, according to the temporal weighted gray scale influence factors of the respective display regions in the first preset region, which is formed by taking the display region as the center thereof, and the spatial weighting model; and the compensation coefficient calculation unit is configured to determine the gray scale compensation coefficients of the respective display regions, according to the spatial weighted gray scale influence factors of the respective display regions.

5. The display apparatus according to claim 4, wherein the compensation coefficient calculation module further comprises a smoothing filter unit; and the smoothing filter unit is configured to perform smoothing filtering processing on the spatial weighted gray scale influence factors of the display regions, to obtain updated spatial weighted gray scale influence factors of the respective display regions, and transmit the updated spatial weighted gray scale influence factors of the display regions to the compensation coefficient calculation unit.

6. The display apparatus according to claim 4, wherein the compensation coefficient calculation unit is configured to, for the spatial weighted gray scale influence factor of any one of the plurality of display regions, map the spatial weighted gray scale influence factor of the display region to a corresponding gray scale compensation coefficient, with a preset first mapping algorithm.

7. The display apparatus according to claim 4, wherein the compensation coefficient calculation module further comprises:

an image data set processing unit, which is configured to determine, for any one of the at least one historical image data set, the multi-frame comprehensive gray scale influence factors of the historical image data set corresponding to the respective display regions, according to single-frame gray scale influence factors of respective frames of image data of the historical image data set in the respective display regions, to obtain the gray scale influence information of the historical image data set.

8. The display apparatus according to claim 7, wherein the multi-frame comprehensive gray scale influence factor of the historical image data set corresponding to a same display region of the plurality of display regions is equal to an average value of the single-frame gray scale influence factors of all frames of image data of the historical image data set in the same display region.

9. The display apparatus according to claim 8, wherein the display apparatus comprises X rows and Y columns of X×Y display regions, X and Y each being a positive integer;

the image data set processing unit comprises X×Y third data processing units and at least one fourth data processing unit;

the third data processing units are in one-to-one correspondence with the display regions, and are each configured to sequentially accumulate the single-frame gray scale influence factors of the respective frames of image data of the historical image data set in the same display region, to determine a sum of the single-frame gray scale influence factors of the respective frames of image data of the historical image data set in the same display region; and the at least one fourth data processing unit is configured to determine the average value of the single-frame gray scale influence factors of all frames of image data of the historical image data set in the same display region, according to the sum, which is transmitted by the third data processing unit, of the single-frame gray scale influence factors of the respective frames of image data of the historical image data set corresponding to the same display region and the number of the frames of image data in the historical image data set.

10. The display apparatus according to claim 7, wherein the compensation coefficient calculation module further comprises a single-frame image processing unit and a gray scale mapping unit;

the single-frame image processing unit is configured to obtain, for any one frame of frame image data, single-frame gray scale data corresponding to each display region, according to gray scale data of pixels in the display region of the frame image data; and the gray scale mapping unit is configured to, for the single-frame gray scale data of any one of the plurality of display regions, map the single-frame gray scale data of the display region to a corresponding single-frame gray scale influence factor, with a preset second mapping algorithm.

11. The display apparatus according to claim 10, wherein the single-frame gray scale data of the frame image data corresponding to one of the plurality of display regions is equal to an average value of the gray scale data of all pixels of the frame image data in the display region.

12. The display apparatus according to claim 11, wherein the display apparatus comprises X rows and Y columns of X×Y display regions, X and Y each being a positive integer;

the single-frame image processing unit comprises Y first data processing units and at least one second data processing unit;

each of the Y first data processing units corresponds to one column of display regions, different first data processing units correspond to different columns of display regions, and the Y first data processing units are each configured to process row by row the display regions in the frame image data to be processed;

the first data processing unit is specifically configured to sequentially accumulate gray scale data of respective rows of pixels in one of display regions corresponding to a currently processed row of display regions, to determine a sum of the gray scale data of the pixels in the display region; and the second data processing unit is configured to determine the single-frame gray scale data of the display region, according to the sum, which is transmitted by the first data processing unit, of the gray scale data of the pixels in the display region and the number of the pixels in the display region.

13. The display apparatus according to claim 10, further comprising a first pre-processing module;

wherein the first pre-processing module is configured to, for any one frame of frame image data, obtain the gray scale data of each pixel according to gray scale data of sub-pixels of the pixel in the frame image data.

14. The display apparatus according to claim 7, further comprising a first cache module, wherein the first cache module is provided with a circular queue structure formed by a plurality of storage spaces; and the first cache module is configured to, in response to control of a data write signal, receive the gray scale influence information, which is transmitted by the image data set processing unit, of the historical image data set, and write, in a sequential storage manner, the received gray scale influence information of the historical image data set into one of the plurality of storage spaces in the circular queue structure.

15. The display apparatus according to claim 14, wherein the first cache module is further configured to, after writing the received gray scale influence information of the historical image data set into one of the storage spaces in the circular queue structure, transmit, in response to control of a data read signal, the gray scale influence information in total M storage spaces in the circular queue structure to the temporal statistics unit, wherein the M storage spaces comprise one storage space which is written most recently and M-1 other storage spaces which are before, in a writing order, the one storage space which is written most recently.

16. The display apparatus according to claim 15, further comprising a counting module, wherein the counting module is configured to: receive the multi-frame comprehensive gray scale influence factors, which are transmitted by the image data set processing unit, of the historical image data set corresponding to the respective display regions, and each time the multi-frame comprehensive gray scale influence factor of one display region is received, a count is increased by one; and transmit the data write signal to the first cache module, in response to the count reaching a preset threshold value; and the counting module is further configured to transmit the data read signal to the first cache module, every the data write signal is transmitted for a preset number of times.

17. The display apparatus according to claim 3, further comprising a second cache module;

wherein the second cache module receives the gray scale compensation information, which is transmitted by the compensation coefficient calculation module, of the image data set, and updates and stores the gray scale compensation information; and transmits currently stored gray scale compensation information of the image data set to the compensation coefficient determination module, in response to calling information.

18. A display method for a display apparatus, for performing gray scale compensation on display data in the display apparatus, wherein the display apparatus comprises a plurality of display regions, and the display method for the display apparatus comprises:

sampling frame image data in a video frame sequence according to a preset sequence order, to obtain current frame image data; and determining initial gray scale compensation data according to first gray scale data of each pixel in the current frame image data and a pre-generated gray scale compensation data table; acquiring gray scale compensation information of an image data set corresponding to the current frame image data, wherein the gray scale compensation information comprises gray scale compensation coefficients of the current frame image data in respective display regions, and the image data set comprises continuous multiple frames of image data sampled by the sampling module; determining target gray scale compensation data according to the gray scale compensation coefficients of the current frame image data in the respective display regions and the initial gray scale compensation data; and performing gray scale compensation on the current frame image data according to the target gray scale compensation data, to obtain compensated frame image data.

19. A computer device, comprising a processor, a memory, and a bus, wherein the memory stores thereon machine-readable instructions executable by the processor, the processor and the memory communicate with each other over the bus when the computer device is running, and the machine-readable instructions, when executed by the processor, perform the steps of the display method according to claim 18.

20. A computer non-transitory readable storage medium, storing thereon a computer program which, when executed by a processor, performs the steps of the display method according to claim 18.

* * * * *